(12) United States Patent
Satoda

(10) Patent No.: US 8,684,036 B1
(45) Date of Patent: Apr. 1, 2014

(54) CRYOGENIC VALVE

(71) Applicant: Yozo Satoda, San Diego, CA (US)

(72) Inventor: Yozo Satoda, San Diego, CA (US)

(\*) Notice: Subject to any disclaimer, the term of this patent is extended or adjusted under 35 U.S.C. 154(b) by 0 days.

(21) Appl. No.: 13/788,240

(22) Filed: Mar. 7, 2013

(51) Int. Cl.
*F16K 1/14* (2006.01)
*F16K 27/10* (2006.01)
*F16K 27/02* (2006.01)

(52) U.S. Cl.
CPC ............ *F16K 27/029* (2013.01); *F16K 27/102* (2013.01); *F16K 1/14* (2013.01)
USPC .................. 137/625.33; 137/375; 251/129.21

(58) Field of Classification Search
USPC ......... 137/334, 340, 375, 625.33; 251/129.21
See application file for complete search history.

(56) References Cited

U.S. PATENT DOCUMENTS

| | | | | |
|---|---|---|---|---|
| 2,831,326 | A * | 4/1958 | Richards et al. | 251/347 |
| 3,203,628 | A * | 8/1965 | Schoch | 236/75 |
| 3,344,803 | A * | 10/1967 | Testard et al. | 137/375 |
| 3,573,863 | A * | 4/1971 | Doors et al. | 137/375 |
| 3,833,015 | A * | 9/1974 | Kneuer | 137/334 |
| 4,946,107 | A * | 8/1990 | Hunt | 239/585.4 |
| 5,623,960 | A * | 4/1997 | Kawamura et al. | 137/375 |
| 6,311,950 | B1 * | 11/2001 | Kappel et al. | 251/129.06 |

OTHER PUBLICATIONS

Declaration of Yozo Satoda dated Oct. 31, 2013, in 2 pages.
ASCO RedHat Catalog for Direct Acting, Normally Closed General Service Solenoid Valves, Brass or Stainless Steel Bodies 1/8" to 3/8" NPT, printed Oct. 31, 2013, in 4 pages.
Kelly Pneumatics, Inc. Catalog for Midsize Proportional Cryogenic Valve as found on www.kpiwebsite.com, printed Oct. 31, 2013, in 2 pages.
Gems Sensors & Controls Catalog for Solenoid Valves, printed Oct. 31, 2013, in 1 page.

\* cited by examiner

*Primary Examiner* — John Fox
(74) *Attorney, Agent, or Firm* — Knobbe Martens Olson & Bear LLP

(57) ABSTRACT

A cryogenic valve includes a first port and a second port, a valve body, a valve stem, a sealing member, a valve element and a housing. The valve body includes a valve seat defining a fluid orifice in fluid communication with the first port. The valve stem is configured to engage with the valve body, wherein at least one of the valve stem and valve body form an inner valve cavity. The valve element is positioned within the inner valve cavity. The valve element is also configured to bias the sealing member against the orifice to substantially block flow through the orifice and the first port. The bias is controlled in response to control of the valve element by a valve actuator. A channel is configured to allow fluid flow through at least one of the valve stem and valve element along a longitudinal axis. A housing is configured to substantially seal and enclose at least a portion of the valve body and valve stem. The housing forms an inner housing cavity configured to thermally isolate the exterior of the valve body and valve stem from the housing.

20 Claims, 15 Drawing Sheets

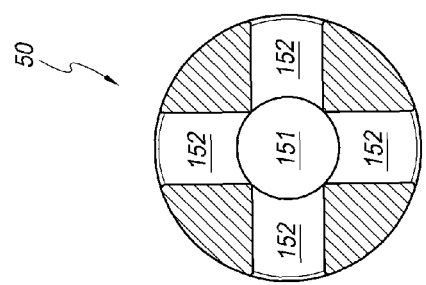
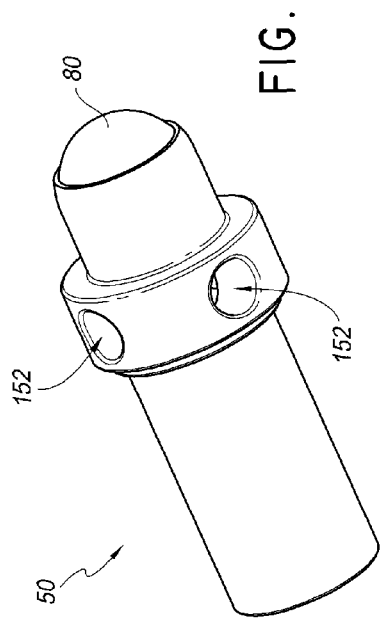
FIG. 6
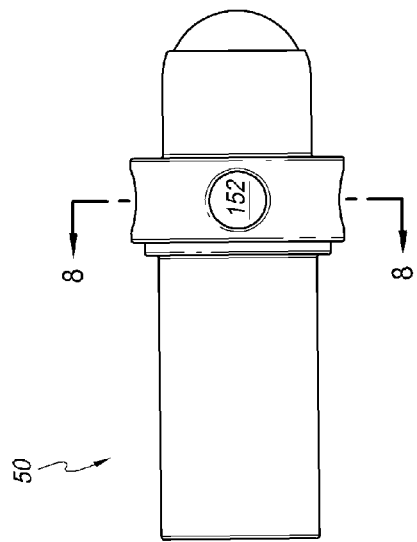
FIG. 7
FIG. 8

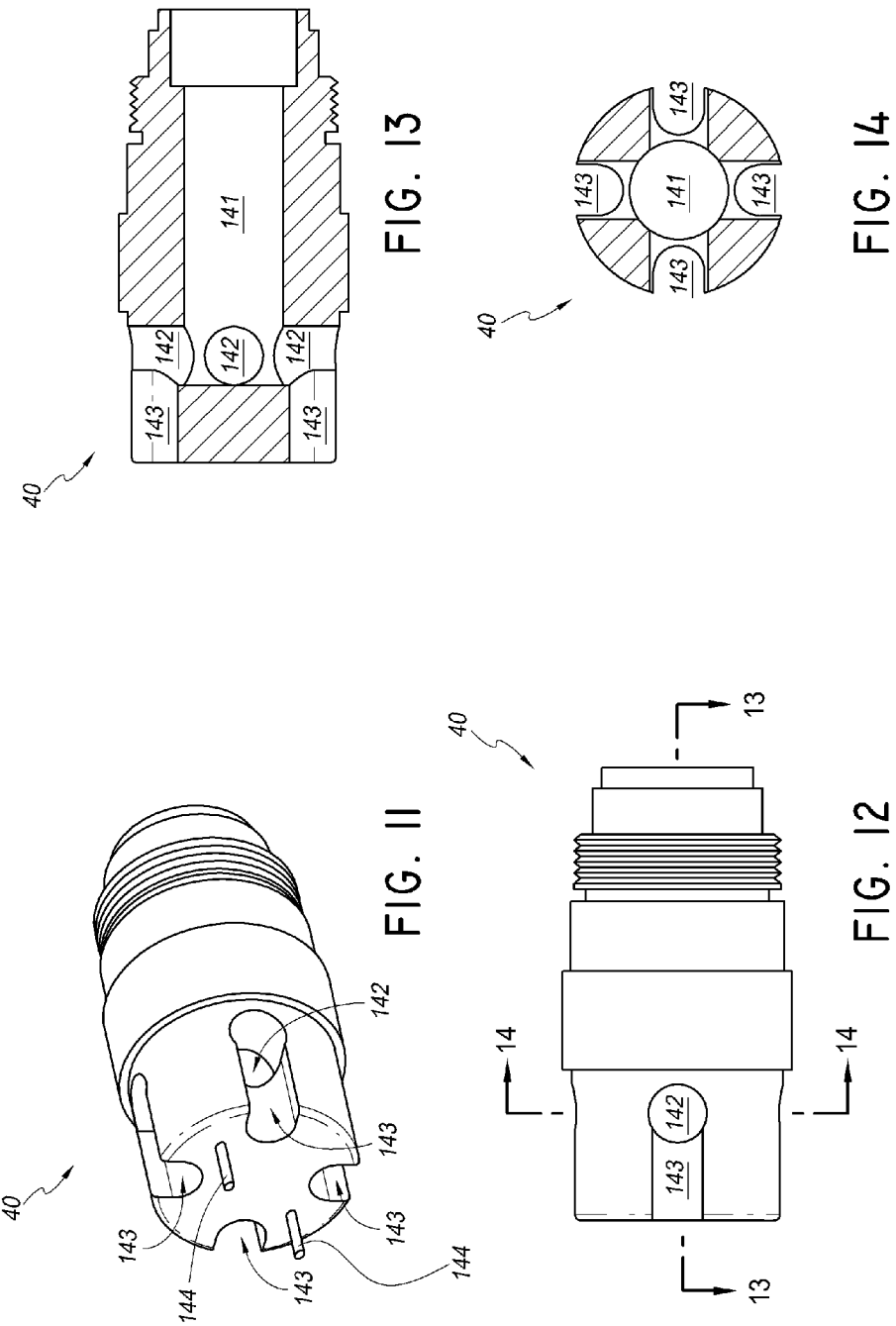

CRYOGENIC VALVE

BACKGROUND OF THE INVENTION

1. Field of the Development

This application relates to a valve. More particularly, this application relates to sealing structures within valves, materials used for components employed within valves, and more particularly, ball and needle valves employing such features within cryogenic applications and systems.

2. Description of the Related Art

Conventional manual valve designs have been attempted for use within harsh environments, including those subject to increased vibration or shock, corrosive or extreme temperature conditions (such as cryogenic applications). However, conventional valves may be limited in their range of environmental use, and may not be capable of reliably, accurately, and/or efficiently opening and closing over extended life cycles. For example, components within cryogenic valves may crack and fail within a relatively short life cycle. Accordingly, there is a need for an improved valve and improved components that may be implemented within such a valve.

SUMMARY

Disclosed herein are ball valves with improved reliability and ease of use. Some embodiments use improved materials to provide previously unrecognized benefits in reliability. Some embodiments include welded engagement perimeters between various components of the valves, which can prevent the valves from leaking fluid (i.e. liquid or gas) and protect them from exterior environmental conditions. Such sealing can prevent, for example, problems related to condensation, or formation of ice on or within the valves. Some embodiments of the valves herein can be electronically controlled. Some embodiments can prevent leaks that may result from valve vibration, for example, due to action of an electronic solenoid actuator to electronically control the valve. Some embodiments provide an inline valve configuration that can improve flow through the valves, improve the ease with which the valves can be installed, and/or improve the thermal isolation between the interior of the valve and an external environment. Some embodiments provide two or more of the aforementioned advantages, any one of which can improve the reliability, ease of installation, and operation costs of the valves and the systems implementing them.

In accordance with one embodiment, a cryogenic valve includes a first port and a second port, a valve body, a valve stem, a sealing member, a valve element, and a housing. The valve body includes a valve seat defining a fluid orifice in fluid communication with the first port. The valve stem is configured to engage with the valve body. The valve stem includes a first end and an opposite second end with a longitudinal axis extending through the first end and second end. The valve stem forms a first channel extending substantially along the longitudinal axis. The first channel is configured to allow fluid flow through the valve stem. The valve element is positioned within at least a portion of the first channel. The valve element is configured to bias the sealing member against the orifice to substantially block flow through the orifice and the first port, wherein the bias is controlled in response to control of the position of the valve element by a valve actuator. The housing is configured to substantially seal and enclose at least an engagement portion of the valve body and valve stem, and form an inner housing cavity configured to thermally isolate at least a portion of the valve body and valve stem, including said engagement portion, from the housing.

In a further embodiment, a cryogenic valve is provided. The valve includes a valve seat, a sealing member and a valve element. The valve seat defines a fluid orifice. The sealing member comprises an approximate hardness value greater than or equal to approximately HV2000 on the Vickers HV scale. The valve element is sized and configured to bias the sealing member against the orifice to substantially block flow through the orifice.

In a further embodiment, a cryogenic valve includes a valve body, a valve element, a valve stem, and a weld. The valve body includes a valve seat defining a fluid orifice. The valve element is configured to substantially block flow through the orifice when the valve element is moved to a closed position. The valve stem is configured to engage with the valve body along an engagement perimeter, wherein at least one of the valve stem and the valve body form an inner valve cavity configured to receive the valve element. The weld is configured to hermetically seal the engagement perimeter between the valve stem and the valve body.

BRIEF DESCRIPTION OF THE DRAWINGS

FIGS. 6 and 7 are perspective and side views, respectively, of an embodiment of a valve element.

FIG. 8 is a side cross-sectional view of the valve element shown in FIGS. 6 and 7.

FIGS. 11 and 12 are perspective and side views, respectively, of an embodiment of a valve stem.

FIG. 13 is a side cross-sectional view of the valve stem shown in FIG. 12.

FIG. 14 is a front cross-sectional view of the valve stem shown in FIG. 12.

DETAILED DESCRIPTION OF VARIOUS EMBODIMENTS

Figure 1A:
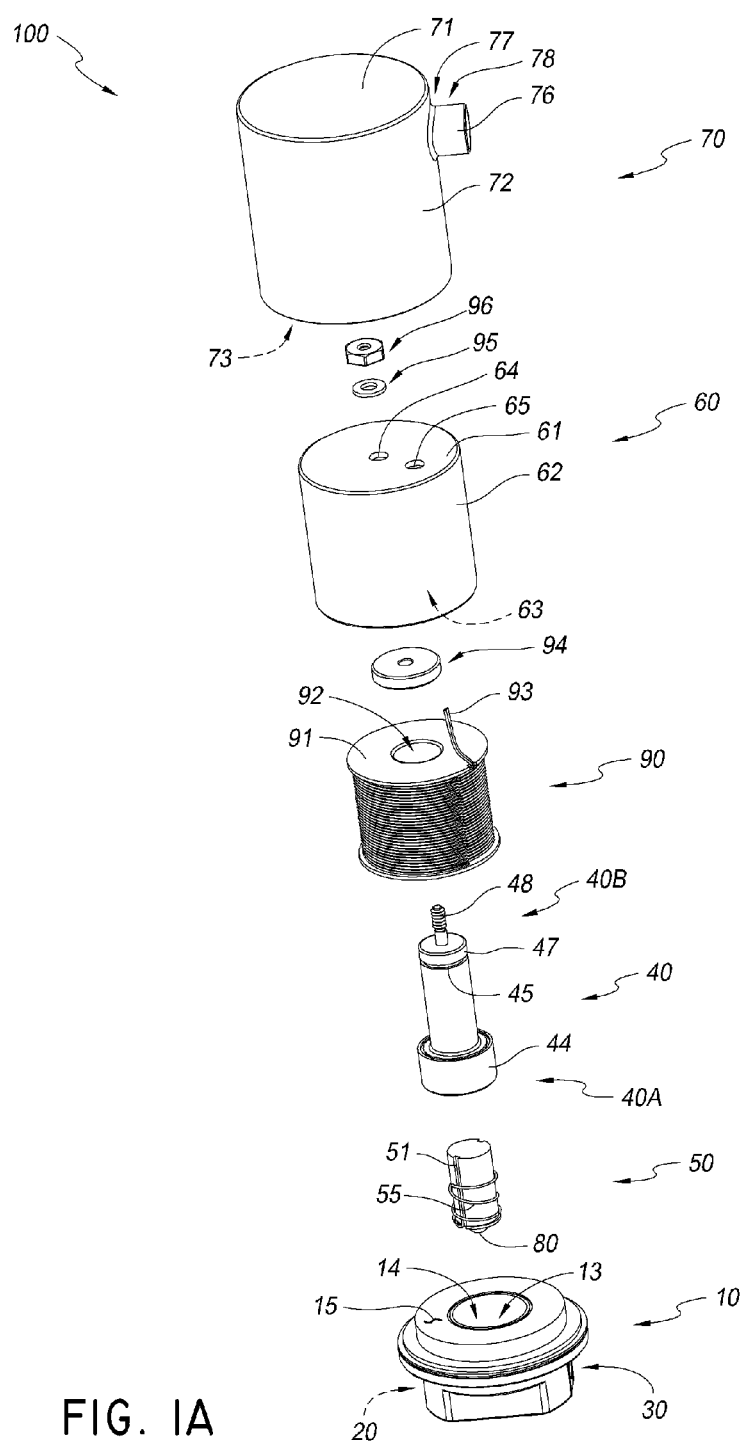
FIGS. 1A and 1B are upper and lower exploded perspective views, respectively, of an embodiment of a valve.

Although embodiments will be discussed below in terms of a ball or needle valve for use in cryogenic applications, it will be understood that the inventions can be employed with other valve applications.

Conventional valve designs do not reliably, accurately, and/or efficiently open and close over extended life cycles, particularly when the valves are employed within harsh environments, such as high or low temperatures, shock or vibration, or other conditions. The reliability can be exacerbated due to repeated cycling of such conditions, such as repeated thermal cycling, which can cause thermal shock and/or vibration due to repeated thermal expansion and contraction of a valve and its components. Valves used to flow cryogenic fluids, such as liquid nitrogen, may become unreliable because of increased wear on the valve components that may occur at lower temperatures. Additionally, condensation that may build on or within various valve components, and/or leakage of fluid being transferred by the valves, can also cause premature wear or failure. The condensation and/or leaking can also cause shorts within a valve electrical control system, which has prevented conventional valves from being controlled electronically. By limiting conventional valves to manual control, systems implementing such valves require additional operators at additional cost. Additionally, leaking or condensation may cause contamination issues within some systems that require a clean environment, such as a semiconductor or biotech application. The problems with condensation can be exasperated in cryogenic valve applications, when the condensed liquid forms ice on or within the valve components, such as the valve housing. Additionally, the leaking, condensation and/or ice formation can increase costs due to the loss of gases escaping from the system in which the valve is employed. In cryogenic or other systems in which the temperature of the gas being transported differs from that of atmosphere, or differs upon release to atmosphere, the leaking, condensation and/or ice formation can waste energy. Moreover, conventional valve designs may be difficult to install, and/or may have reduced flow capabilities due to flow path restrictions within the valve. Accordingly, there is a need for an improved valve and improved components that may be implemented within such a valve.

Disclosed herein are valves with improved reliability and ease of use. Some embodiments of these valves use improved materials, or combination of materials, for components within the valves to provide previously unrecognized benefits in reliability. Some embodiments of these valves are configured to seal the engagement perimeter between various components of the valves, which can prevent the valves from leaking fluid and protect them from exterior environmental conditions. Such sealing can prevent, for example, the aforementioned problems related to condensation, or formation of ice on or within the valves. Such sealing may allow some embodiments of the valves herein to be electronically controlled. For example, the valves herein may include solenoid or other electronic switching mechanisms, to provide increased speed and control of fluid flow within a system in which one or more of the valves are employed. Conventional cryogenic valves did not have sufficient sealing, and would leak, preventing them from being used with solenoid or other automating electronics. Thus, any redistribution of flow within manual cryogenic systems was time consuming and difficult to manage. Embodiments of the valves herein can allow for implementation with a control system, allowing switching at various response times, some of which are less than or equal to 0.5 seconds.

Some embodiments of the valves herein provide an inline valve configuration that can improve flow through the valves, and/or improve the ease with which the valves can be installed. Some embodiments of the valves herein, such as some inline valve embodiments, may be compatible with a jacketed line. A jacketed line includes a double-walled piping system, with a second conduit surrounding a first internal conduit through which a fluid, such as a cryogenic liquid, is being transported. The second wall can comprise an external sleeve, jacket, or other additional barrier to reduce convection and thermally isolate the internal conduit from an external environment, to prevent energy loss. Some inline valves described herein can include an additional thermal housing or barrier that can be engaged with a jacketed line, and provide similar benefits. In some embodiments, the volume trapped between the thermal barrier and the valve is held to a vacuum, to be compatible with a vacuum jacketed line. In some such embodiments, the volume trapped between the thermal barrier and the valve can form a common volume with the vacuum within a vacuum jacketed line. Some embodiments of these valves provide two or more of the aforementioned advantages, any one of which can improve the reliability, ease of installation, and operation costs of the valves and the systems implementing them.

The features, aspects and advantages of the present development will now be described with reference to the drawings of several embodiments, which are intended to be within the scope of the invention herein disclosed. These and other embodiments will become readily apparent to those skilled in the art from the following detailed description of the embodiments having reference to the attached figures, the invention not being limited to any particular embodiment(s) herein disclosed.

Figure 1B:
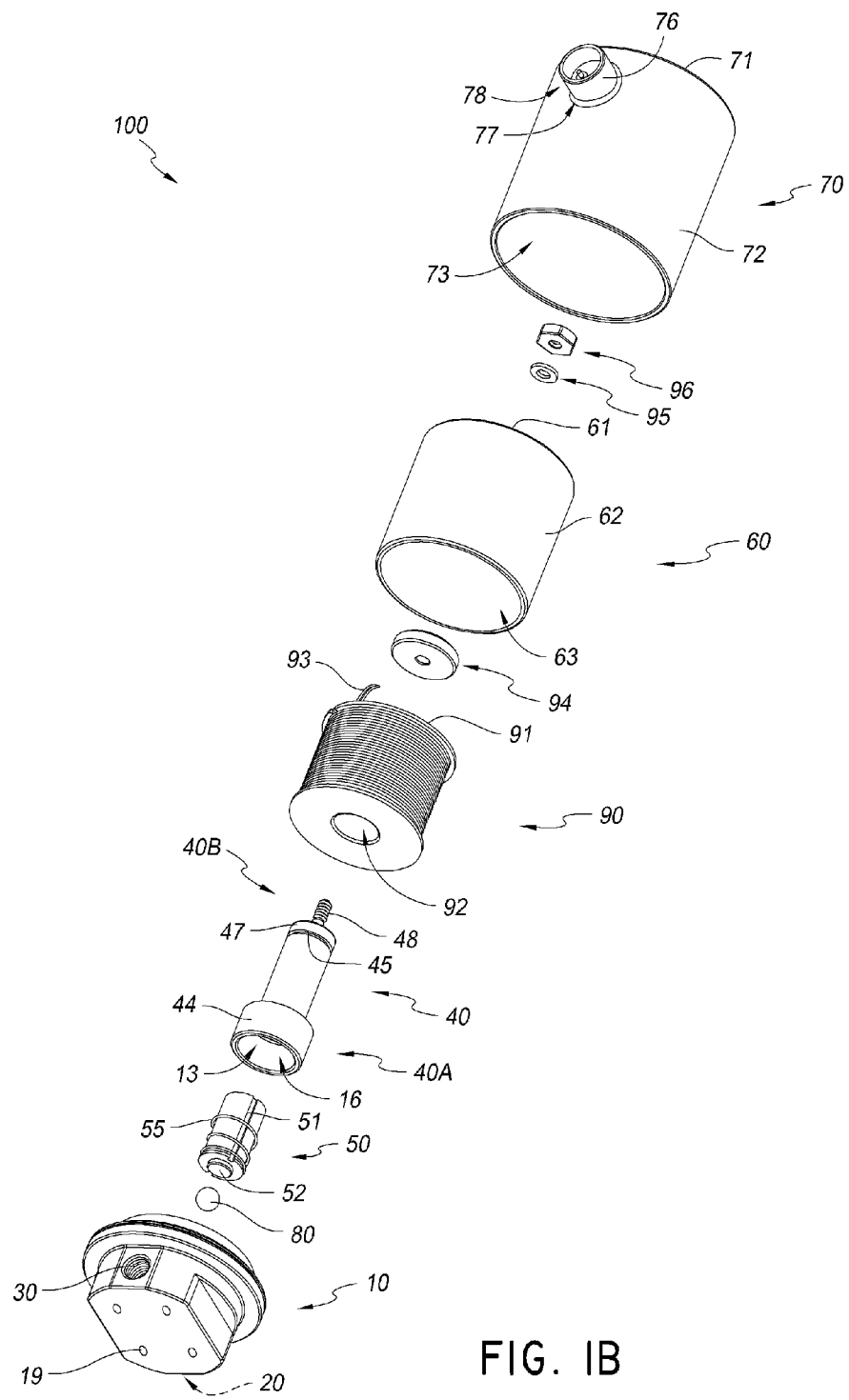
Figure 2:
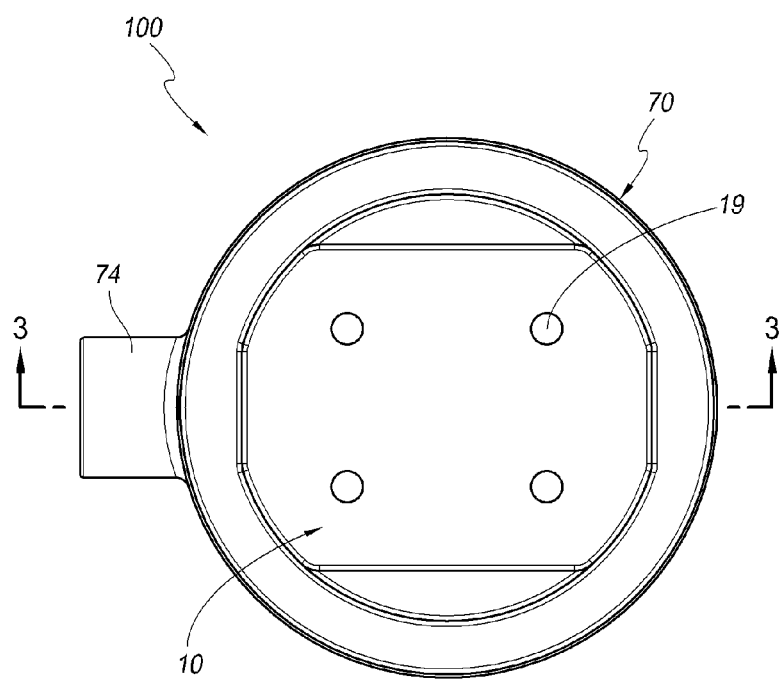
FIG. 2 is a bottom view of the valve of FIG. 1.
Figure 3A:
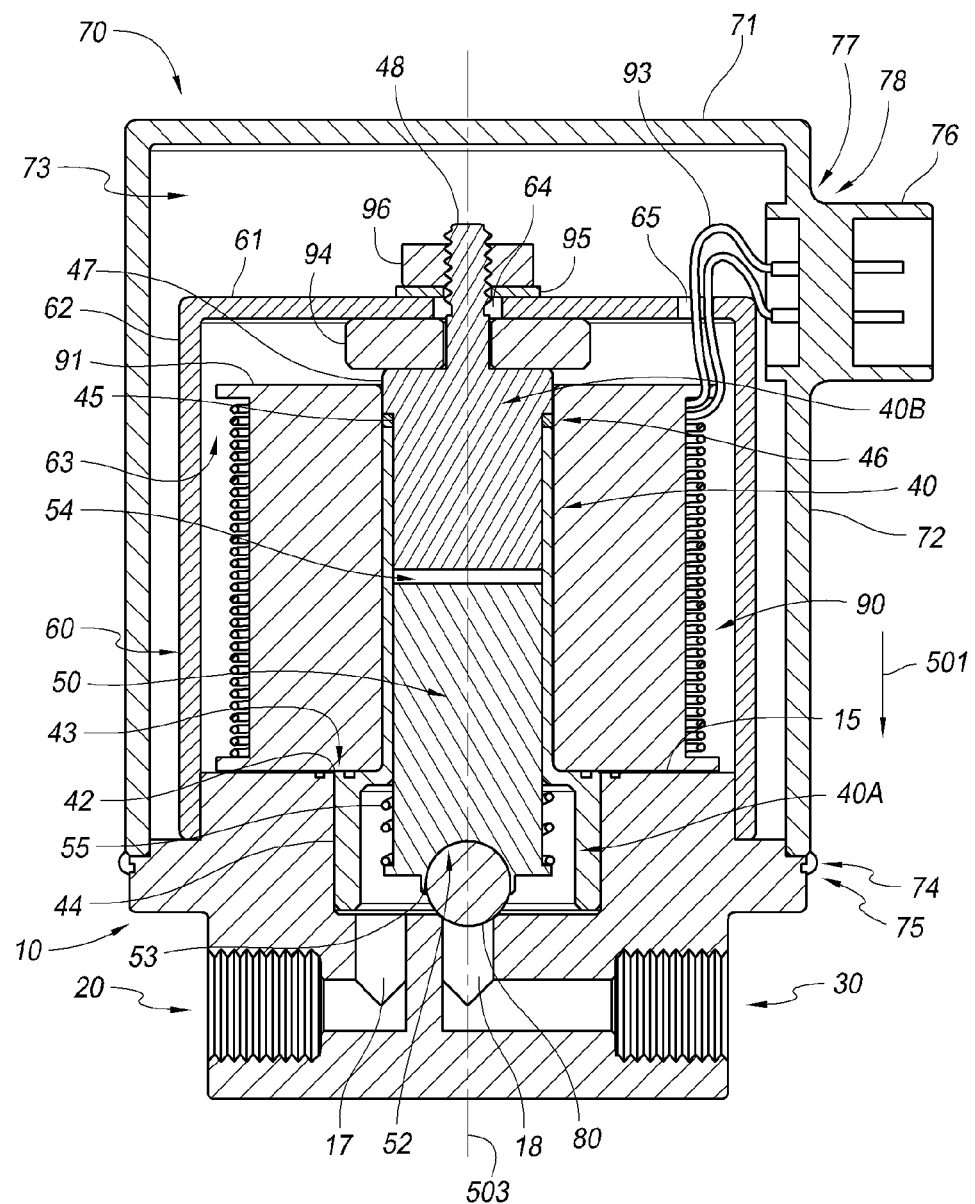
FIG. 3A is a side cross-sectional view of the valve shown in FIG. 2 in a closed position.
Figure 3B:
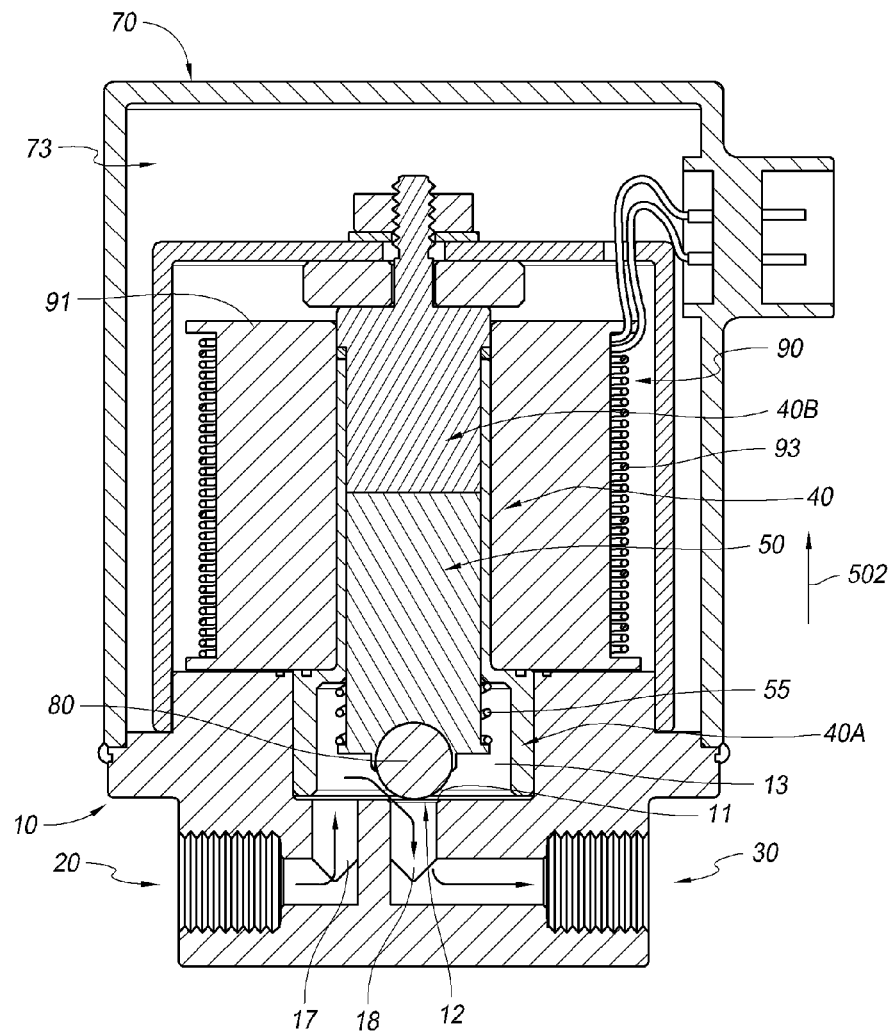
FIG. 3B is a side cross-sectional view of the valve shown in FIG. 2 in an opened position.

FIGS. 1 through 3B illustrate a valve 100 according to an embodiment of the invention. The valve 100 generally includes a valve body 10 with a first port 20 and second port 30 configured to allow the flow of fluid into and from the valve body. The valve body 10 can include a valve seat 11 defining a fluid orifice 12 in fluid communication with the first port 20, as best shown in FIG. 3B. A sealing member, such as a ball 80, can be configured to seal with the valve seat 11. In some embodiments, other sealing members, such as tip of a valve element for a needle valve, can be employed instead of ball 80. An example of such an embodiment is described below and shown in FIG. 20. The embodiment of the needle valve element shown in FIG. 20 can be employed within valve 100, or the other valves described herein. The valve 100 can include a valve stem 40 configured to engage with the valve body 10. At least one of the valve stem and valve body can be configured to form an inner valve cavity 13. A valve element 50 can be positioned within and received by the inner valve cavity 13. In some embodiments, valve 100 can include a housing 70 configured to enclose at least a portion of the valve body and valve stem within an inner housing cavity 73.

Valve 100 can be configured in a closed position, as shown in FIG. 3A. For example, valve element 50 can be configured to bias the ball 80 against the orifice 12, such that the flow is substantially blocked through the orifice 12 (FIG. 3A). When valve 100 is in such a closed or biased position, the ball 80 and the valve element 50 can substantially block flow between the inner valve cavity 13 and the second port 30. In this way, the ball 80 and the valve element 50 can substantially block flow between the first port 20 and the second port 30 when valve 100 is in a closed position. As used herein "substantially block" or "substantially blocked" means that a substantial portion of the flow through valve 100 can be blocked, although small amounts of leakage or bleed may be suitable, even when the valve 100 is in a closed or substantially blocked position, under some applications and in accordance with those skilled in the art.

The valve 100 can be configured in an open position, as shown in FIG. 3B. For example, ball 80 can be positioned such that it is not biased against the orifice 12, and does not substantially block flow through the orifice 12. When valve 100 is in such an open position, the ball 80 and the valve element 50 can allow flow between the inner valve cavity 13 and the second port 30. In this way, the ball 80 and the valve element 50 can allow flow through the valve 100 between the first port 20 and the second port 30 when the valve 100 is in an open position.

The aforementioned positioning of the valve 100 between an open and closed position can be provided in a number of different ways. For example, the valve 100 can comprise a spring, shock, or other biasing element to move or bias valve 100 to or towards an open or closed position. In some embodiments, a pneumatic actuator, solenoid coil, linear actuator, motor, or other suitable type of linear or rotational valve actuator can be provided to move or bias valve 100 to an open or closed position.

Referring to FIG. 3A, a biasing element, shown as a spring 55 for illustrative purposes only, can be configured to move or bias the valve element 50 in the direction shown by directional arrow 501. In turn, valve element 50 can move or bias the ball 80 against the orifice 12 in direction 501, closing the valve 100 or maintaining the valve 100 in a closed position. The bias between spring 55 and ball 80 can be provided in a number of different ways. In the illustrated embodiment, the spring 55 is positioned between valve element 50 and another portion of valve 100, such as valve stem 40. Spring 55 can be configured to engage with these components of valve 100 with one or more flanges, shoulders, grooves, hooks, tabs, or other similar spring-engaging structure.

Referring to FIG. 3B, a first valve actuator can be configured to allow the valve element 50 to be biased or moved in the direction shown by directional arrow 502. In turn, valve element 50 can move or bias the ball 80 away from the orifice 12 in direction 502, opening the valve 100 or maintaining the valve 100 in an open position. Any of the aforementioned or known valve actuators can be employed to provide this functionality. For example, valve 100 can include a solenoid coil 90 comprising solenoid wire 93 wrapped around a solenoid frame 91. The frame 91 and coiled wire 93 can form an inner solenoid channel 92 (FIGS. 1A, 1B, 3A) configured to receive a portion of the valve stem 40. Solenoid coil 90 can be configured to be activated and deactivated, which in turn can move valve element 50, when valve element 50 is positioned within the inner valve cavity 13. In this way, valve 100 can be opened and closed by controlling the movement or bias of the valve element 50 in a first direction by the solenoid coil 90, and by the spring 55 in a second, opposite direction. It will be understood that in some embodiments, a second valve actuator can be employed instead of or in addition to a biasing element (e.g., spring 55), to move or bias valve 100 in the direction opposite that of the first valve actuator (e.g., solenoid coil 90). Additionally, it will be understood that in some embodiments, a first valve actuator can be configured to move or bias valve 100 towards a closed position, with a biasing element configured to move or bias valve 100 towards an opened position.

Valve body 10 can comprise any of a number of different shapes, and is not limited to the approximately round cross-section or cylindrical shape shown. A body cavity 14 can extend into valve body 10, to form at least a portion of the inner valve cavity 13. Inner valve cavity 13 can be configured to receive valve stem 40, or a portion thereof. It will be understood that body cavity 14 is optional, and that inner valve cavity 13 can be formed as a part of valve stem 40, in addition to or as an alternative to being formed as part of valve body 10. For example, in some embodiments, a valve stem can be flush-mounted onto an upper surface of a valve body, with the inner valve cavity being formed in a portion of the valve stem.

The valve body 10 can comprise any of a number of different materials, such as metal, depending on the conditions under which the valve 100 is employed. Preferably, the valve body 10 comprises a magnetic metal. In some embodiments, the valve body 10 comprises a corrosion-resistant material. The valve body 10 can comprise Stainless Steel (e.g., 316L SST). Valve body 10 can comprise a magnetic or non-magnetic material.

The valve stem 40 can comprise any of the shapes or materials described above for the valve body 10. In the illustrated embodiment, the valve stem 40 comprises a valve stem proximal portion 44 configured to engage with the valve body 10, and a valve stem distal portion 47 extending from proximal portion 44. The valve stem 40 can comprise a first end 40A, and a second, opposed end 40B, with a longitudinal axis 503 extending through both the first end 40A and the second end 40B. A channel 16 can extend along a portion of the longitudinal axis 503, to form at least a portion of the inner valve cavity 13. In the illustrated embodiment, the channel 16 extends partially into, but not through, the valve stem 40. In other embodiments (e.g., FIGS. 4A, 4B, and 9), the channel 16 can extend through the valve stem 40.

The engagement between valve body 10 and valve stem 40 can be provided with welding, or other suitable engagement methods known or described herein. In some embodiments, the valve stem 40 and valve body 10 can be sealed (e.g., hermetically sealed) with respect to each other. In some embodiments, an engagement perimeter 42 can be formed around a portion of the valve stem 40, such as valve stem base 44, and a portion of valve body 10, such as an upper body surface 15. A weld 43 can be configured to extend along and seal (e.g., hermetically seal) the engagement perimeter 42. Such a weld can reduce the likelihood of leakage of fluid through valve 100, for example, between the inner valve cavity 13 and inner housing cavity 73. For example, the weld 43 (and other welds described herein) can reduce the likelihood of leakage of the fluid being flowed through valve 100, reducing waste. The weld 43 (and other welds described herein) can also reduce the likelihood of fluids or other materials entering into a portion of valve 100, and causing contamination or reduced performance of the valve, as is seen in conventional valves. For example, the welds described herein can prevent moisture from entering valve 100, reducing the likelihood of condensation or ice formation therein. In some embodiments, the welds, in combination with the other materials and structural configurations described herein, can allow fluid within the valve to be in contact only with the materials of the body, valve stem, and valve element.

Conventional cryogenic valves require such ice to be removed during equipment shutdown and maintenance periods, which the present embodiments reduce or eliminate. The weld 43 (and other welds described herein) can include grooves to reduce the amount of heat transfer during the welding process. Generally, the materials described herein used for embodiments with two valve components welded together can include substantially similar thermal expansion coefficients to avoid substantial loss of function of the weld after thermal cycling, in accordance with those skilled in the art. In some embodiments, the difference between the thermal expansion coefficients of the two materials, is no greater than approximately $0.01 \times 10^{-6}$/degrees C., or even no greater than approximately $0.008 \times 10^{-6}$/degrees C. The thermal expansion coefficients can become relevant due to the temperature swings of 1000 degrees C. or more during the welding of valve components, or even more, when the low temperature of the cryogenic fluid being flowed through the valves is considered.

The proximal portion 44 and distal portion 47 of the valve stem 40 can comprise any of the materials described herein for body 10, and can comprise the same or different materials with respect to each other. In a preferred embodiment, the proximal portion 44 comprises a magnetic insulating material, such as stainless steel, and the distal portion 47 comprises a magnetic material, to facilitate the transfer of magnetic force from the solenoid coil 90 to the valve element 50. In an even more preferred embodiment, the proximal portion 44 comprises 316L SST and the distal portion comprises 430F SST, Allegheny Ludlum 4750, or other magnetic alloy.

The proximal portion 44 and the distal portion 47 can be integrally or separately formed with respect to each other. In some embodiments, proximal portion 44 comprises a separate component configured to engage with distal portion 47 using known engagement methods or those described herein. Proximal portion 44 can be hermetically sealed with respect to distal portion 47. An engagement perimeter 45 can be formed around proximal portion 44 and distal portion 47, similar to the engagement perimeter 42. A weld 46 can extend along the engagement perimeter 45, similar to weld 43, to reduce the likelihood of leakage between the inner valve cavity 13 and inner housing cavity 73.

In some embodiments, valve 100 may include a shell 60 positioned within the inner housing cavity 73. Shell 60 can be configured to enclose and protect the solenoid coil 90 within an inner shell volume 61. Shell 60 can also provide shielding for the magnetic field formed by the solenoid coil 90. Shell 60 can be any of a number of different shapes that form the inner shell volume 61. For illustrative purposes, the shell 60 includes a cover 61 with a sidewall 62 extending therefrom. Shell 60 can comprise any of the aforementioned materials described for the valve body 10. In a preferred embodiment, shell 60 comprises a magnetic material, such as 430F SST, Mumetal, or Allegheny Ludlum 4750, to improve the shape and performance of the magnetic field provided by the solenoid coil 90 to the valve element 50. In an even more preferred embodiment, shell 60 comprises a magnetic material, with a relatively high saturation flux density and low hysteresis, such as "49"® Alloy, manufactured by Carpenter Technology, located in Wyomissing, Pa.

The shell 60 can be configured to engage with valve body 10 and/or valve stem 40, with any of the engagement methods known or described herein. In some embodiments, the valve stem 40 can include a pole piece 48 configured to extend through an aperture 64 extending through a portion of the shell 60, such as cover 61. Pole piece 48 can be threaded to allow a nut 96 and washer 95 to secure the shell 60 to valve stem 40. An optional magnetic spacer 94 can be positioned on pole piece 48 (e.g., within the inner shell volume 63) when shell 60 is engaged with valve stem 40. The magnetic spacer 94 can reduce the likelihood of the magnetic field saturating the tip of pole piece 48. Such reduction in magnetic field saturation can improve magnetic flux to the shell 60, which in turn, can improve actuation of valve element 50 by solenoid coil 90. The magnetic spacer 94 and the shell 60 can be separately or integrally formed. In some embodiments, shell 60 can comprise an integrally formed piece that includes portions that are formed to provide similar function as spacer 94. An additional aperture 65 can extend through the shell 60 to allow passage of wires or other control components, such as solenoid wire 93, through shell 60 (FIG. 3A).

Valve element 50 can comprise any of a number of shapes suitable to be positioned at least partially within the inner valve cavity 13 and/or channel 16 and to move in response to a valve actuator. Valve element 50 can comprise an elongated member (i.e., with a longitudinal length greater than its width). When positioned within the inner valve cavity 13 and/or channel 16, valve element 50 can extend approximately along the longitudinal axis 503. In some embodiments, valve element 50 can comprise an approximately cylindrical or rod-like shape. However, it will be understood that valve element 50 can also comprise a square, rectangular, or other regular or irregular shape, and can vary in cross sectional shape and size along its length and/or width. In some embodiments, valve element 50 can include a groove 51 (FIG. 1A) that relieves trapped fluid within a volume formed by a gap 54 between valve element 50 and valve stem 40 (FIGS. 3A; 3B) during movement of valve element 50. Valve element 50 and/or valve stem 40 can be configured with a stop, such as a shoulder, tab, flange or other suitable element to limit the movement of valve element 50 with respect to valve stem 40 in one or more directions. For example, distal portion 47 of valve stem 40 can act as a stop to prevent movement of valve element 50 in the direction 502 shown in FIG. 3B.

Valve element 50 can include any suitable structure to provide the bias of ball 80 against the orifice 12. For example, the valve element 50 can be configured to attach to ball 80; in other embodiments the valve element 50 can press against ball 80 without actually being attached to ball 80. In some embodiments, the valve element 50 can include a recess 52 (as best shown in FIG. 1B) configured to receive or engage with at least a portion of the ball 80. In some embodiments, recess 52 can be configured to receive greater than 50% of the volume of the ball 80, to provide a more secure fit. Recess 52 can be configured to engage with a portion of ball 80 through an interference or press fit, or other suitable mechanical engagement system. In some embodiments, a flange or lip 53 can extend from a portion of the valve element 50 and wrap around and secure a portion of the ball 80 (FIGS. 3A; 3B). Ball 80 and valve element 50 can be attached to each other, for example, by pressing them together and crimping or rolling the lip 53 onto a portion of the ball 80. The recess 52 and lip 53 can be positioned, for example, at a distal end of valve element 50, with recess 52 extending proximally from the distal end. In some embodiments, recess 52 or lip 53 can be configured to allow valve element 50 to be attached to ball 80 without additional attachment mechanisms, such as adhesive, epoxy, silicon, rubber, and the like. Such embodiments can increase the purity of the fluid-wetted components within valve 100. Such improved purity can in turn improve the purity of the cryogenic fluid or other material passing through the valve. In some embodiments, recess 52 can be sized to hold ball 80, while still allowing for some movement (e.g. rotational movement) of ball 80 therein, to reduce wear, and to allow for some thermal expansion between the components.

The ball 80 can comprise a material and shape with sufficient roundness, diameter uniformity, surface finish, and/or hardness suitable to engage and seal with the orifice 12 of valve seat 11. Ball 80 can comprise can comprise a material capable of withstanding repeated thermal cycling and mechanical shock. Ball 80 can comprise a material that is substantially inert, to avoid reaction with fluid flowing through the valve 100. Ball 80 can comprise a substantially solid or hollow structure. Ball 80 can comprise an imperforated structure, at least within the portions of ball 80 that seal with the valve seat 11 and cover orifice 12. In some embodiments, substantially the entirety of ball 80 comprises a substantially solid, imperforated material.

In some embodiments, the ball 80 can comprise a material and shape with various material characteristics, such as roundness diameter tolerance, sphericity, and/or hardness suitable to engage and seal with the orifice 12 of valve seat 11 over prolonged life-cycles. A material falling within certain ranges of these physical characteristics can be selected to allow prolonged use of valve 100 in harsh environments, such as corrosive, and/or extreme temperature conditions (e.g., cryogenic applications), without substantial loss of function (e.g., leakage), in accordance with the tolerance of those skilled in the art. For example, a material with an outside diameter tolerance ranging between approximately ±0.005 inches and approximately ±0.00001 inches, and in some embodiments, better than or equal to approximately ±0.0005 inches, or more preferably, better than or equal to approximately ±0.0001 inches, or even more preferably, better than or equal to approximately ±0.00005 inches, has provided unexpected and previously unrecognized performance for some embodiments of the valves described herein. A material with a sphericity tolerance ranging between approximately ±0.005 inches and approximately ±0.00001 inches, and in some embodiments, better than or equal to approximately ±0.0001 inches, or more preferably, better than or equal to approximately ±0.00001 inches, or even more preferably, better than or equal to approximately ±0.00002 inches or even more preferably, better than or equal to approximately ±0.000024 inches, has provided unexpected and previously unrecognized performance for some embodiments of the valves described herein.

A material with a hardness ranging between approximately C20 on the Rockwell scale and HV 2500 on the Vickers HV scale, and in some embodiments, an approximate hardness on the Rockwell scale greater than or equal to approximately C55, and preferably an approximate hardness on the Rockwell scale greater than or equal to approximately C60, or more preferably, an approximate hardness on the Rockwell scale greater than or equal to approximately A92, or more preferably, an approximate hardness on the Vickers scale greater than or equal to approximately 2000lHV has provided unexpected and previously unrecognized performance for some embodiments of the valves described herein. In some embodiments, ball 80 may comprise an industrial sapphire ball, ruby ball, cubic zirconia ball, and tungsten carbide ball. In some embodiments, ball 80 may comprise a material selected from a group comprising chromium steel, tool steel, stainless steel, sapphire, ceramic, and tungsten carbide. Ball 80 can comprise a chemically resistant or inert material, or a material otherwise resistant to the fluid being flowed through valve 100, such as cryogenic fluid The material of ball 80 may also be selected based upon the application to which a cryogenic fluid is being supplied from valve 100. For example, Teflon might be selected for high purity applications or applications in which a quieter operation is useful. Sapphire might be selected for high purity applications, such as semiconductor or medical applications. Other materials, such as SST, other types of steels, or other materials with lower purity, might be selected for applications for which purity is of lesser importance, such as food processing, medical, high vacuum stations, cold storage, liquefied natural gas, or other general testing or temperature control applications.

In some embodiments, the ball 80 can be formed from a single crystal of material, that can be grown in quantities. Testing of valve 100 in which ball 80 comprised industrial sapphire material allowed for reliable opening and closing of valve 100, without substantial leakage, failure, or visible signs of wear, in accordance with the tolerance of those skilled in the art, after 250,000 cycles, and is anticipated to reach as many as one million cycles in a cryogenic application. Industrial sapphire may be used, due to its increased chemical resistance to cryogenic fluid and vapors, ability to be grown in a single crystal, increased hardness and wear resistance, diametric and spherical tolerances, and thermal resistance. Similar unexpected results are anticipated with use of other types of ball materials, such as industrial ruby balls, cubic zirconia balls, and tungsten carbide balls.

Examples of materials that may be used for ball 80, with examples of one or more of the aforementioned characteristics, are provided in Tables 1-3. Values not provided would be reasonable values as understood by a person having ordinary skill in the art to be inherent to the materials shown.

TABLE 1

| Material | Cr Steel | Tool Steel | Stainless Steel |
| --- | --- | --- | --- |
| Alloy (example) | E 52100 | M 50 | 304SS |
| Dia. Toler (inches) | ±0.0001 | ±0.00005 | ±0.0005 |
| Sphericity (inches) | ±.000025 | ±0.00001 | ±0.0001 |
| Hardness | Rockwell C60-C67 | Rockwell C55-C62 | Rockwell C25-C39 |
| Yield Strength | 295,000 psi | | 32,000 psi |
| Composition | Cr, Fe | Cr, Mo, V, Fe | Fe, Cr, Mn, Ni, Si |
| Magnetism | Magnetic | Magnetic | Non-Magnetic |

TABLE 2

| Material | Stainless Steel | Stainless Steel | Sapphire |
| --- | --- | --- | --- |
| Alloy (example) | 316SS | 440 C | Single Crystal $Al_2O_3$ |
| Dia. Toler (inches) | ±0.0005 | ±0.0001 | ±0.00005 |
| Sphericity (inches) | ±0.0001 | ±0.000024 | ±0.000025 |
| Hardness | Rockwell C25-C39 | Rockwell C58-C65 | Vickers HV 2300 |
| Yield Strength | 75,000 psi | 275,000 psi | |
| Composition | Fe, Ni, Cr, Si | Fe, Ni, Mn, Si, C | $Al_2O_3$ |
| Magnetism | Non-Magnetic | Magnetic | Non-magnetic |

TABLE 3

| Material | Teflon | Tungsten Carbide |
| --- | --- | --- |
| Alloy (example) | N/A | Co6%, W (pressure formed) |
| Dia. Toler (inches) | ±0.002 | ±0.0001 |
| Sphericity (inches) | ±0.001 | ±0.000025 |
| Hardness | Shore D50-D65 | Rockwell A92 |
| Yield Strength | | NR |
| Composition | PTFE | Co6%, W |
| Magnetism | Non-magnetic | Low Magnetic |

Continuing to refer to FIGS. 1A-3B, the housing 70 can be configured to attach to at least a portion of the valve body 10 and valve stem 40, to substantially enclose and protect these components within the inner housing cavity 73. In some embodiments, the housing 70 can seal at least a portion of the valve body 10 and valve stem 40 within the inner housing cavity 73. The housing cavity 73 can be configured to thermally isolate the exterior of the valve body 10 and valve stem 40 from the housing 70. For example, it may be beneficial to thermally isolate the exterior of the valve body 10 and the valve stem 40 from the housing 70, when the valve 100 is being used to transport a hot or cold fluid. In a cryogenic application, such thermal isolation can prevent condensation and ice from building on the exterior of valve 100. In some embodiments, housing 70 can be sufficiently sealed with respect to the remainder of valve 100 such that housing cavity 73 can be held to a vacuum, to prevent convection within cavity 73 and thus provide improved thermal isolation. Such vacuum can be provided through an additional vacuum port extending through housing 70 into housing cavity 73. Housing 70 can comprise any of the materials described herein for body 10. In some embodiments, housing 70 comprises 316L SST.

Housing 70 can be any of a number of different shapes that form the inner housing cavity 73. For illustrative purposes, the housing 70 includes a cover 71 with a sidewall 72 extending therefrom. Cover 71 can be integrally or separately formed with respect to sidewall 72. In some embodiments, cover 71 can be a separately formed component that is engaged (e.g., welded) with respect to another portion of housing 70, such as sidewall 72. In some embodiments, housing can comprise two covers at opposing ends of sidewall 72 (e.g., FIGS. 4A; 4B; 9 and 10). The housing 70 can engage with at least one of the valve body 10 and/or valve stem 40 in a number of ways, such as those described herein for engaging valve body 10 to valve stem 40. For example, a weld 75 can extend along an engagement perimeter 74 extending around a portion of housing 70, such as a lower portion of sidewall 72. Such a weld can seal (e.g., hermetically seal) the housing to a portion of the valve body 10 and/or valve stem 40, and reduce the likelihood of fluid leakage to and from the inner housing cavity 73. Weld 75 along engagement perimeter 74 can provide similar benefits to valve 100 as described above for weld 43 along the engagement perimeter 42.

A connector 76 can be positioned on and extend through housing 70, to allow electrical communication with one or more other components of valve 100. For example, connector 76 can be connected to one or more solenoid wires 93 to allow control of solenoid coil 90 (and thus valve 100) from a control system external to housing 70. A bridge rectifier or other voltage converter can be included, for example, within cavity 73, to provide DC power to the coil 90. Preferably, connector 76 is configured to allow wires to be connected to inner terminals on a first side of housing 70 (within inner housing cavity 73), wherein the inner terminals electrically communicate with external terminals positioned on a second opposite external side of housing 70. In some embodiments, an engagement perimeter 77 can be formed around connector 76 and a portion of housing 70. A weld 78 can be configured to extend along and seal (e.g., hermetically seal) the engagement perimeter 77, to reduce the likelihood of fluid leakage to and from the inner housing cavity 73. Such a seal can provide similar benefits as those mentioned herein with respect to the sealing provided by weld 75 around engagement perimeter 74 of housing 70 and valve body 10.

Referring to FIGS. 3A and 3B, ports 20, 30 can be configured in a variety of ways suitable to allow flow of fluid into and from valve 100. For example, the ports 20, 30 can be a variety of shapes, and should not be limited to a circular cross-sectional shape. Additionally, ports 20, 30 can extend into or through various components of valve 100, to allow flow through valve 100. For example, ports 20, 30 can both extend through a portion of body 10, to allow flow into the valve cavity 13. Ports 20, 30 can be aligned approximately parallel or collinear, orthogonal, or at another angle with respect to each other. In some embodiments, ports 20, 30 can be positioned at opposite sides or ends of valve 100. For example, FIGS. 3A, 3B show ports 20, 30 positioned at opposite sides of valve body 10, and aligned approximately collinearly. Such a collinear configuration includes port channels 17, 18, which redirect flow from ports 20, 30 and thus change the angle of flow between ports 20, 30, respectively, in order to communicate with the inner cavity 13. Although the angle of channels 17, 18 with respect to ports 20, 30, need not be orthogonal, the redirection of the flow from ports 20, 30 into inner cavity 13 can reduce the amount of flow through valve 100. Ports 20, 30 can include other features to fluidly connect valve 100 to an external system. For example, ports 20, 30 can include threads, a compression fitting, a pipe (such as a welded pipe), or other structure to facilitate fluid connection of valve 100. Valve body 10 can include other attachment features, such as mounting holes 19 (FIG. 1B; FIG. 2), to structurally attach valve body 10 to an external system.

Figure 4A:
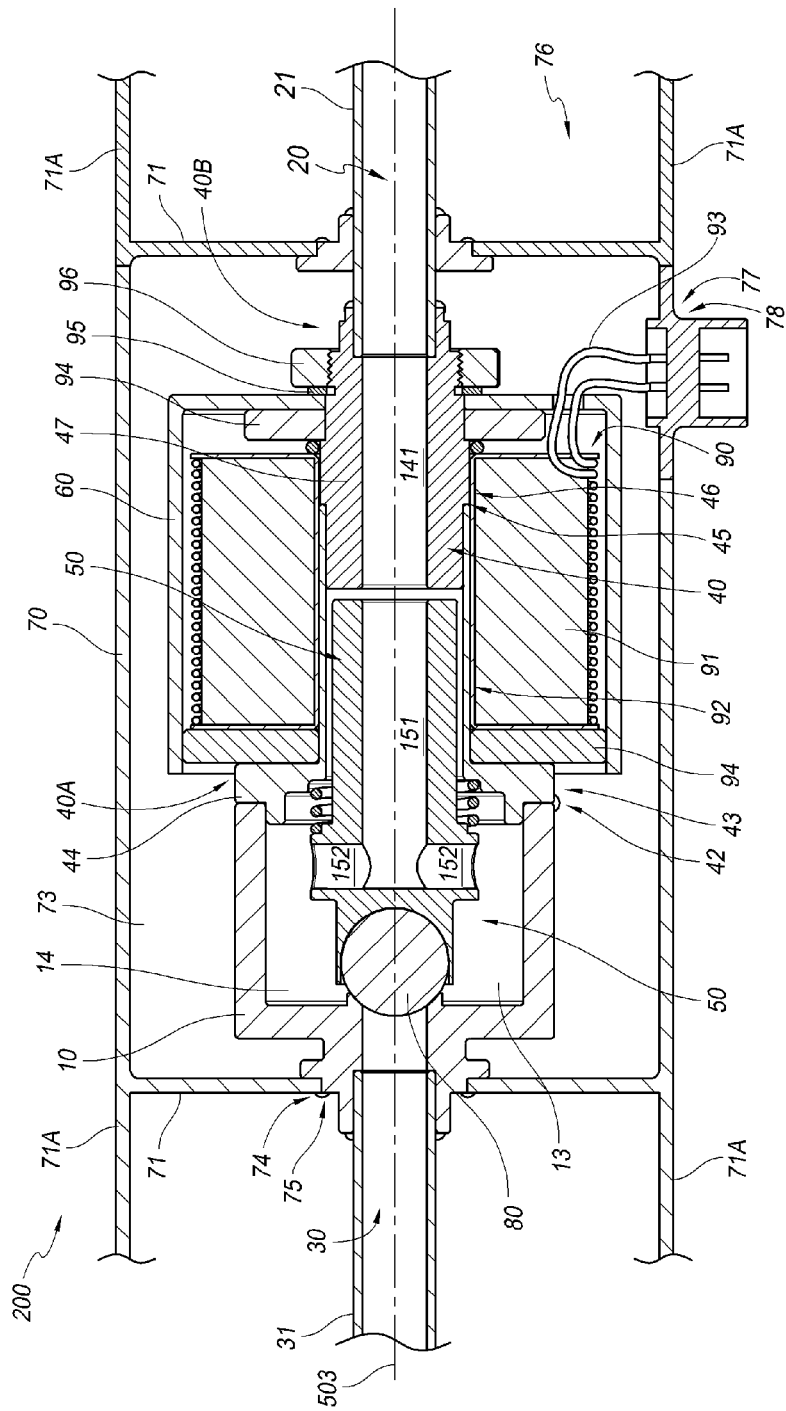
FIG. 4A is a side cross-sectional view of an embodiment of an inline valve in a closed position.
Figure 4B:
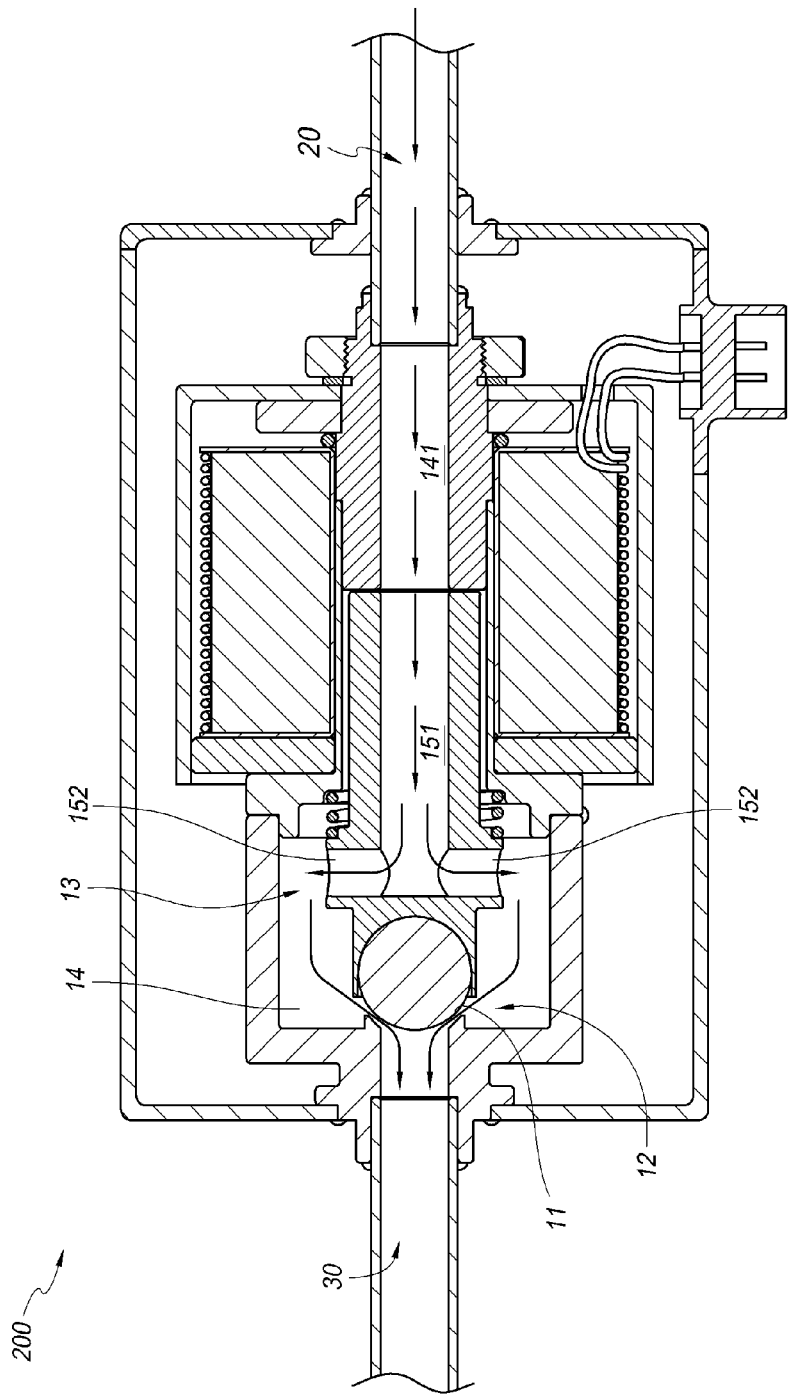
FIG. 4B is a side cross-sectional view of an embodiment of an inline valve in an opened position.
Figure 5:
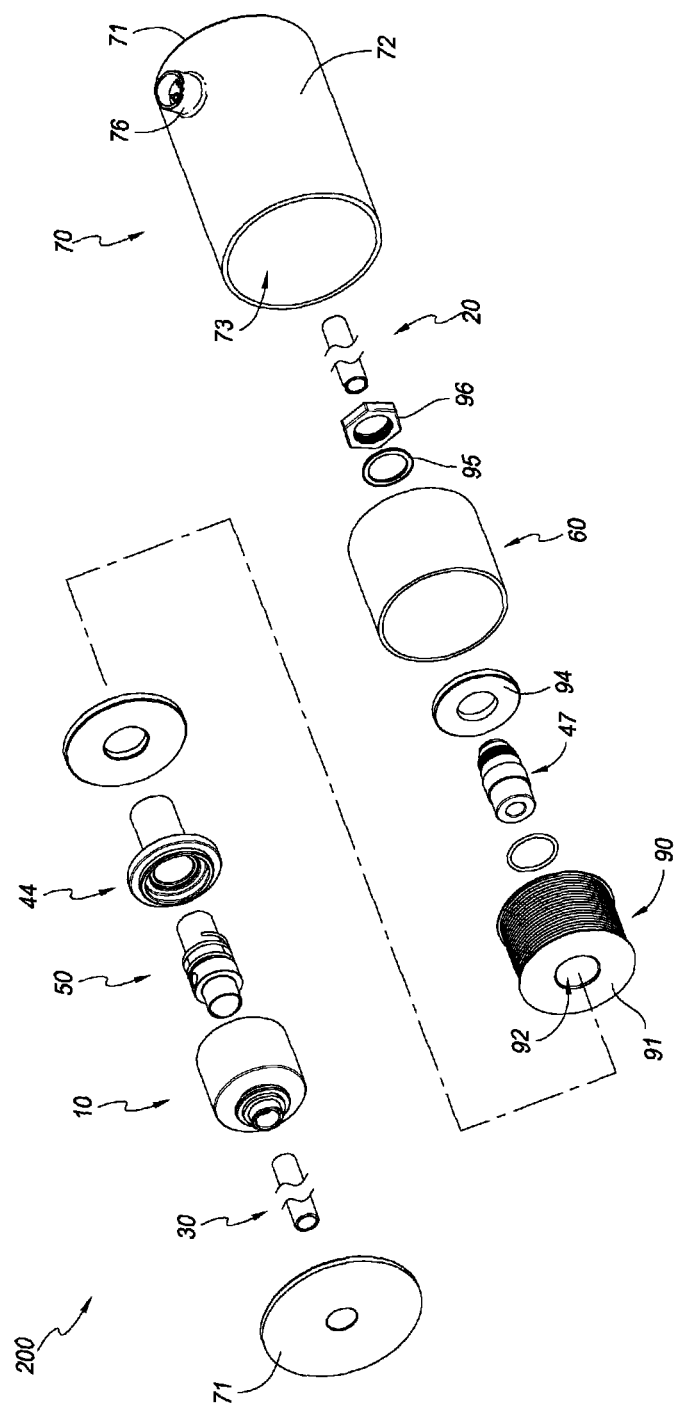
FIG. 5 is an exploded perspective view of an embodiment of an inline valve.

FIGS. 4A-5 show an embodiment of an inline valve 200, which can include ports 20, 30 positioned at opposite longitudinal ends of valve 200 (with respect to longitudinal axis 503). Many features and components of valve 200 are substantially similar to those described herein for valve 100. Some of the differences are related to the shape and alignment of the flow channels through valve 100, to reduce obstructions or change in flow directions, which in turn can reduce pressure drops and increase flow capacity. Some of the features also allow the inline valve 200 to be employed inline and within a jacketed line, to thermally isolate valve 200 from an external environment. Ports 20, 30, can include pipe portion 21, 31, to facilitate fluid connection (e.g., by welding) of valve 200 within a piping system. Pipe portions 21, 31 can be sized to fit standard piping sizes, such as ⅜" or ¼" depending on the desired valve flow rate. Other fluid connection structures can be employed, as described elsewhere herein. Housing 70 can be configured to substantially enclose (e.g., seal or hermetically seal) substantially the entirety of the remainder of valve 200, such as body 10, valve stem 40, valve actuator 50, shell 60, and solenoid 90. In some embodiments, housing 70 can allow a vacuum to be pulled within cavity 73, as described above. Thus, housing 70 can provide thermal isolation between within the internal components of valve 200 and an external environment, preventing condensation and ice buildup in a cryogenic application. In some embodiments, housing 70 can include extensions 71A that extend beyond covers 71, and allow housing 70 to be connected (e.g. welded) to the sleeve of a double-walled jacketed cryogenic fluid system.

A channel 141 can extend through valve stem 40 substantially along the longitudinal axis 503. The channel 141 can be substantially similar to channel 16 (FIGS. 3A; 3B). In the embodiments shown in FIGS. 4A-5, channel 141 can be in fluid communication with port 20 such that fluid can flow from port 20 through the valve stem 40 at least partially along the longitudinal axis 503. In some embodiments, channel 141 is in fluid communication with port 20 without intervening obstructions, redirection of flow, and/or inhibition of flow between port 20 and channel 141. Channel 141 can extend through approximately the center of valve stem 40, or can be offset with respect to the center of valve stem 40.

In some embodiments, the channel 141 can extend through substantially the entirety of the length of valve stem 40, between the first end 40A and 40B, without intervening obstructions, redirection of flow, and/or inhibition of flow through valve stem 40. In some embodiments, channel 141 does not extend through the entirety of the length of valve stem 40, and additional channels can be provided to further direct flow within valve stem 40, as described further below.

FIGS. 6-8 show various views of an embodiment of valve element 50 that can be implemented within embodiments of valve 200 in FIGS. 4A-5, and other valves described herein. Referring to FIGS. 4A, 4B and 8, one or more channels 151 can extend through a portion of valve element 50. Channel 151 can be configured such that it is in fluid communication with the valve stem channel 141 when valve element 50 is positioned within the inner cavity 13. Channel 151 can be configured to allow fluid flow from valve stem channel 141 into body cavity 14. Channel 151 can be approximately centered or offset within valve element 50. Channel 151 can be configured to allow fluid flow approximately along the longitudinal axis 503 when the valve element 50 is positioned within the inner cavity 13. As used herein, "approximately along the longitudinal axis" can mean approximately collinearly with the longitudinal axis, but can also mean at a slight angle (less than 30 degrees), can mean at a slight curvilinear trajection, and/or can mean along an axis substantially parallel to, but slightly offset from, the longitudinal axis 503.

In some embodiments, channel 151 can channel flow directly into the body cavity 14 from valve stem channel 141. In some embodiments, valve element 50 can include one or more intervening channels extending between channel 151 and body cavity 14. Such intervening channels may allow redirection of flow around ball 80 from channel 151, for example, when ball 80 or other features within valve 200 are aligned with each other. Referring to FIGS. 4A-8, valve element 50 can include one or more channels 152 extending outwardly (e.g., radially) from channel 151. In the illustrated embodiment, four channels 152 extend radially outwardly at various evenly-spaced angles around a cross-sectional circumference of channel 151 (FIG. 8). However, a number of different channels 152 can be employed, at various evenly or unevenly spaced intervals around channel 151. Additionally, channels 151 and 152 (and the other channels described herein) are not limited to circular cross-sectional shapes, and can be square, ovular, or other irregular or regular cross-sectional shapes, and can form openings, slots or other channel-like shape into actuator 50. Channels 152 can extend outwardly from channel 151 at an angle greater than 5 degrees, or more preferably, greater than 20 degrees, or even more preferably, greater than 45 degrees, to allow flow around ball 80 from channel 151. In some embodiments, channels 152 extend orthogonally from channel 151 (e.g., from longitudinal axis 503).

In some embodiments, it may be desired to substantially align one or more features of valve 200 with respect to each other along the longitudinal axis 503, to improve flow, and in some embodiments, allow unrestricted, or free flow through at least some portions of valve 200. As used herein "substantially aligned with respect to each other along the longitudinal axis" means that at least a portion, but not necessarily the entirety, of the cross-sectional flow path of the substantially aligned components overlaps when viewed along the longitudinal axis. For example, two or more of the valve stem channel 141, valve element channel 151, port 20, port 30 and/or orifice 12 can be substantially aligned with respect to each other along the longitudinal axis. In some embodiments, the valve stem channel 141 and valve element channel 151 are substantially aligned with respect to each other along the longitudinal axis. In some embodiments, the valve stem channel 141, valve element channel 151, and at least one of the ports 20, 30 are substantially aligned with respect to each other along the longitudinal axis. In some embodiments, the valve stem channel 141, the valve element channel 151, ports 20, 30 and the orifice 12 are substantially aligned with respect to each other along the longitudinal axis.

Figure 9:
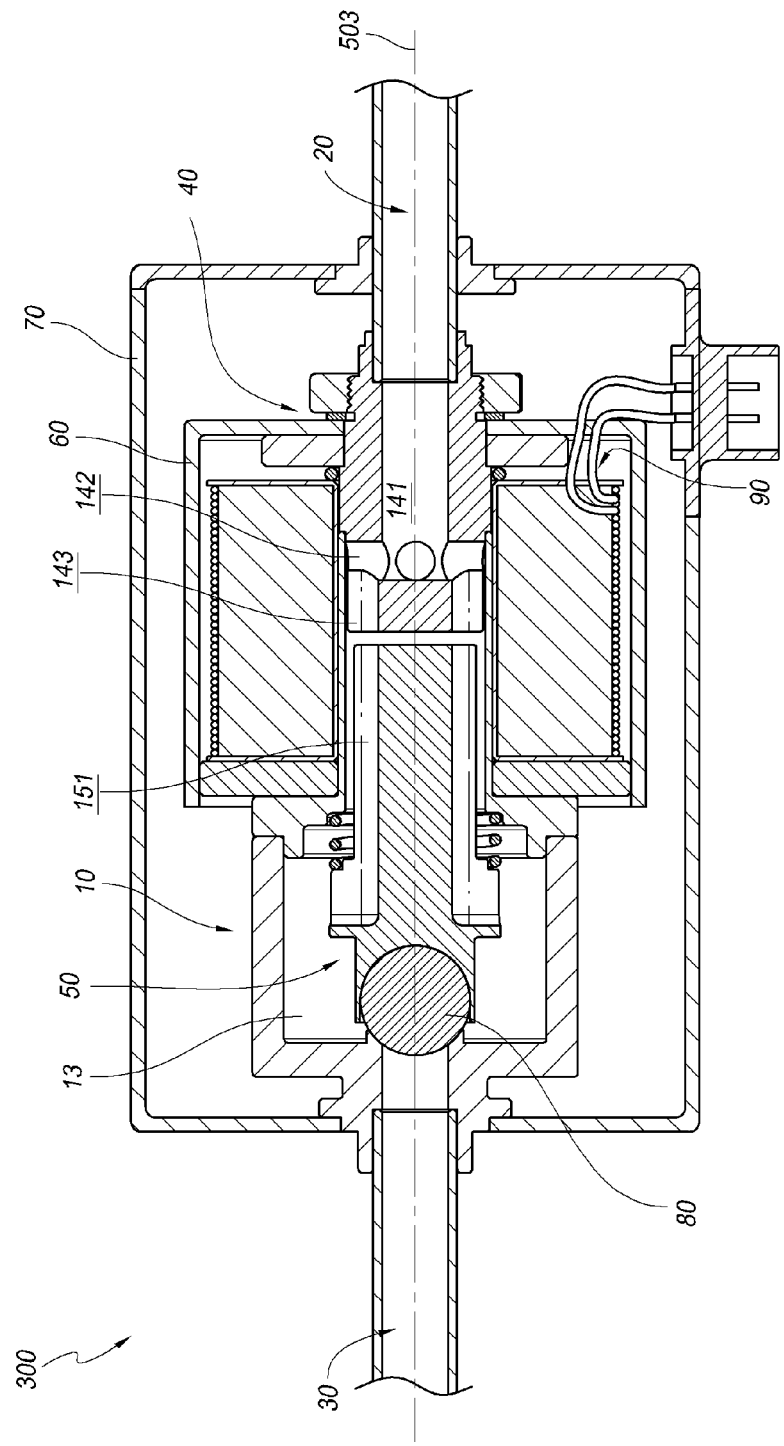
FIG. 9 is a side cross-sectional view of an embodiment of an inline valve in a closed position.
Figure 10:
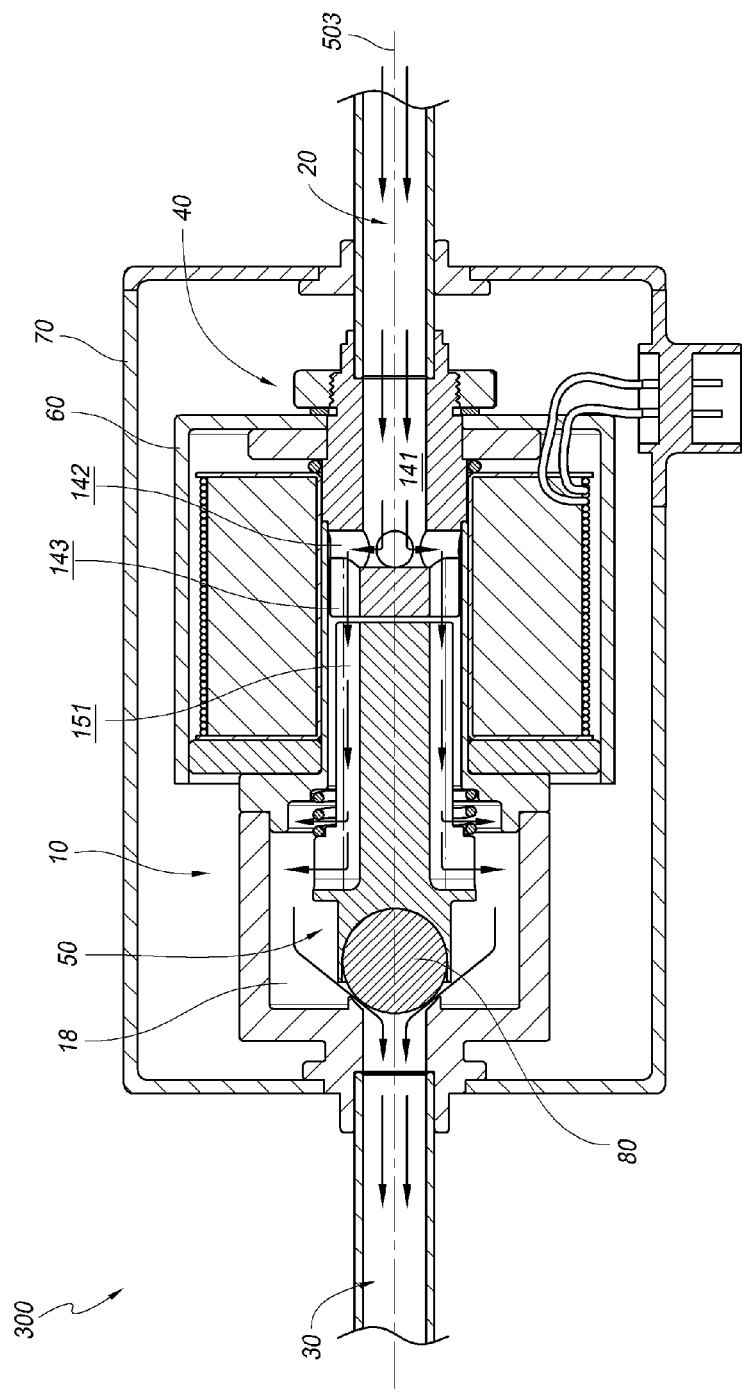
FIG. 10 is a side cross-sectional view of an embodiment of an inline valve in an opened position.
Figure 17:
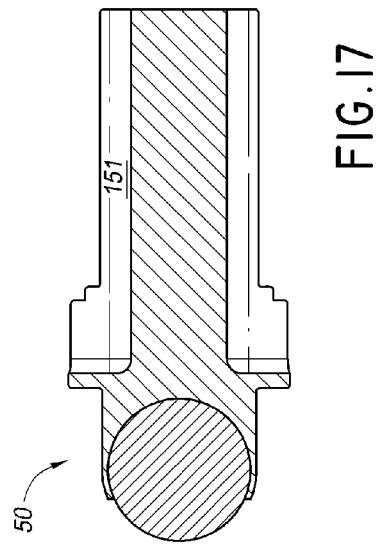
FIG. 17 is a side cross-sectional view of the valve element shown in FIG. 15.
Figure 18:
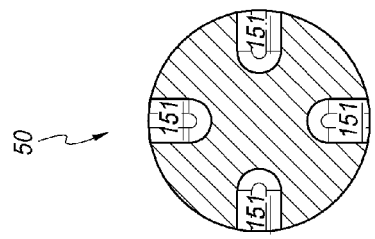
FIG. 18 is a front cross-sectional view of the valve element shown in FIG. 15
Figure 15:
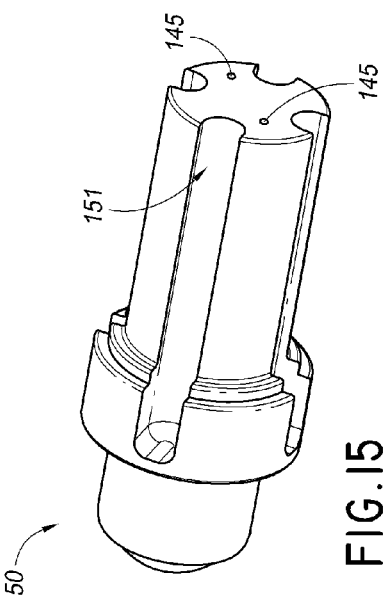
FIGS. 15 and 16 are perspective and side views, respectively, of an embodiment of a valve element.
Figure 16:
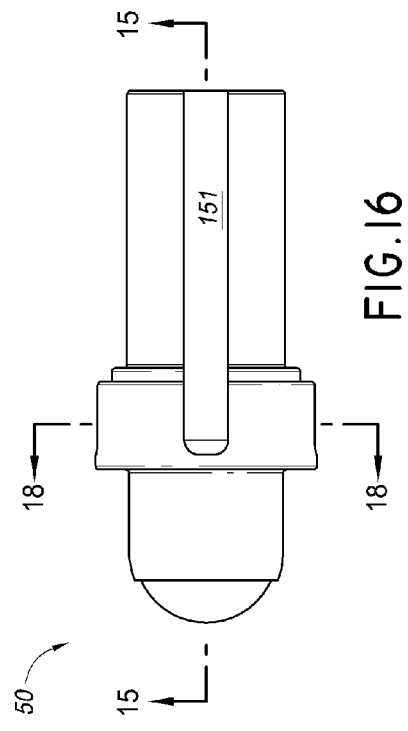

FIGS. 9-10 show embodiments of an inline valve 300 which includes features and components substantially similar to those described herein for valve 200 (FIGS. 4A-4B). FIGS. 11-14 show embodiments of the valve stem 40 that can be implemented within the valve 300 of FIGS. 9-10, or other valves described herein. Some of the differences with valve 300 and its components are related to the shape and alignment of the flow channels through valve 300. For example, intervening channels can be provided to further direct flow from channel 141 within valve stem 40 to the channels within valve element 50.

Referring to FIGS. 9-14, valve stem 40 can include one or more channels 142 extending outwardly (e.g., radially) from channel 141. Channels 142 can extend from channel 141 orthogonally, or at various angles with respect to channel 141, such as the angles described above for channel 152 extending from channel 151. Channels 142 can fluidly connect with channels 143 that extend generally along or parallel with, and in some embodiments, slightly offset from, longitudinal axis 503. Channels 142 and 143 are not limited to the embodiment shown, and a number of different channels 142 and/or 143 can be employed, at various evenly or unevenly spaced intervals around channel 141. It will be understood that although channel 141 does not extend through the entirety of the length of valve stem 40 in FIGS. 11-14, embodiments are anticipated that have channel 141 extending through the entirety of the length of valve stem 40, while still including the additional channels 142 and/or 143.

FIGS. 15-18 show embodiments of the valve element 50 that can be implemented within the valve 300 of FIGS. 9-10, or other valves described herein. Referring to FIGS. 9, 10 and 15-18, channels 143 can be aligned with corresponding similar channels 151 extending at least partially along the length of valve element 50. In some embodiments, valve element 50 and/or valve stem 40 can include one or more guide channels 145 configured to receive one or more corresponding dowel pins 144 (FIGS. 11 and 15) to provide such alignment. It will be understood that grooves, pins, tracks or other suitable alignment structures can be used to align channels 143 and 151. Channels 151 are similar to that described above and shown in FIGS. 6-8, but extend longitudinally through a portion of an outer portion (e.g., circumference) of valve element 50. Channels 151 are configured to allow longitudinal flow (e.g. at a proximal end of valve element 50) within or along valve element 50. Referring also to FIGS. 9 and 10, in some embodiments, channels 151 can include a radially-extending portion (e.g., at a distal end of valve element 50) to allow radial flow into inner valve cavity 13.

It will be understood that although the Figures herein may include arrows showing the flow of fluid through embodiments of the valves shown, the invention should not be limited as such. Some embodiments may be configured to allow flow in the opposite direction, with sufficient biasing element and/or valve actuator force to prevent unintentional opening of the valve by fluid pressure.

It will also be understood that embodiments of the valves described herein can a single-acting or double-acting valve. For example, the valves can be a single-acting valve that is actuated with a solenoid, with a spring return to the non-actuated state. The valves can be normally open or normally closed when in a non-actuated state. For example, it may be beneficial to use a normally open valve, to reduce power consumption to the valve when fluid is flowing through the valve. The switching of the valves, while shown to be controlled with a solenoid, can be controlled pneumatically, or through other suitable methods and devices. The valves illustrated in FIGS. 3A-5, 9 and 10 can be normally closed, with the spring 55 biasing the valve element 50 towards the valve seat 11, and with the solenoid 90 configured to act against this bias and move the valve element 50 away from the valve seat 11 and to an open position. However, it will be understood that the valve logic can be reversed.

Figure 19:
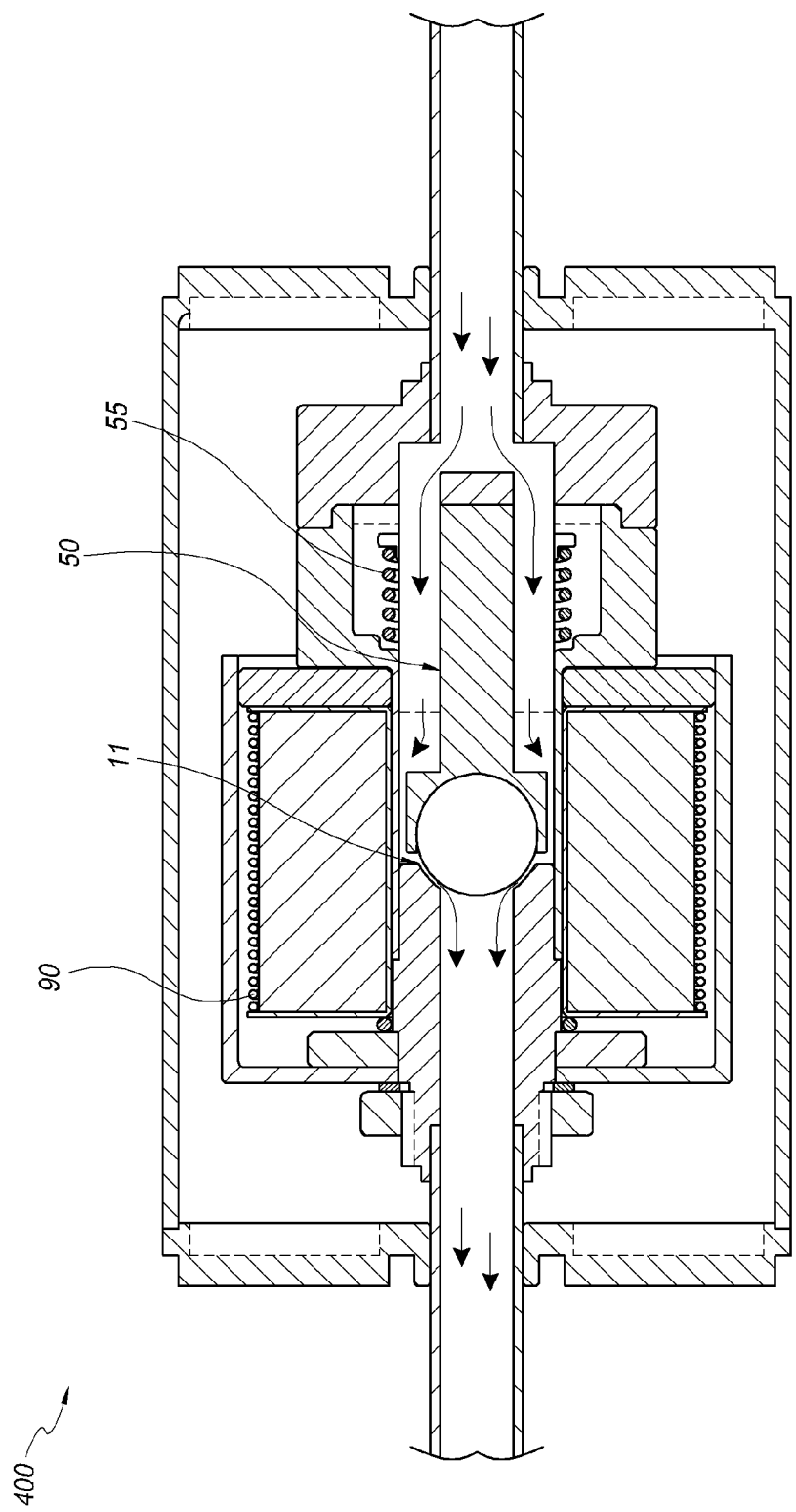
FIG. 19 is a side cross-sectional view of an embodiment of an inline valve in an open position.

FIG. 19 illustrates an embodiment of an inline valve 400 with components similar to those of valves 200 and 300 of FIGS. 4A, 4B, 9 and 10, but with a different spring bias and valve logic. For example, inline valve 400 can be normally open, with the spring 55 configured to bias the valve element 50 away from the valve seat 11, and with the solenoid 90 configured to act against this bias and move the valve element 50 towards valve seat 11 and to a closed position.

It will be understood that the aforementioned spring biasing can be reversed, for either of the normally opened or normally closed valve logic. For example, the valves illustrated in FIGS. 3A-5, 9 and 10 can be normally open, in embodiments wherein the spring 55 is attached to valve element 50 to allow tension therebetween, and biased to pull the valve element 50 from the valve seat 11. Additionally, the valve illustrated in FIG. 19 can be normally closed, in embodiments wherein the spring 55 attached to valve element 50 to allow tension therebetween, and biased to pull the valve element 50 towards the valve seat 11.

Figure 20:
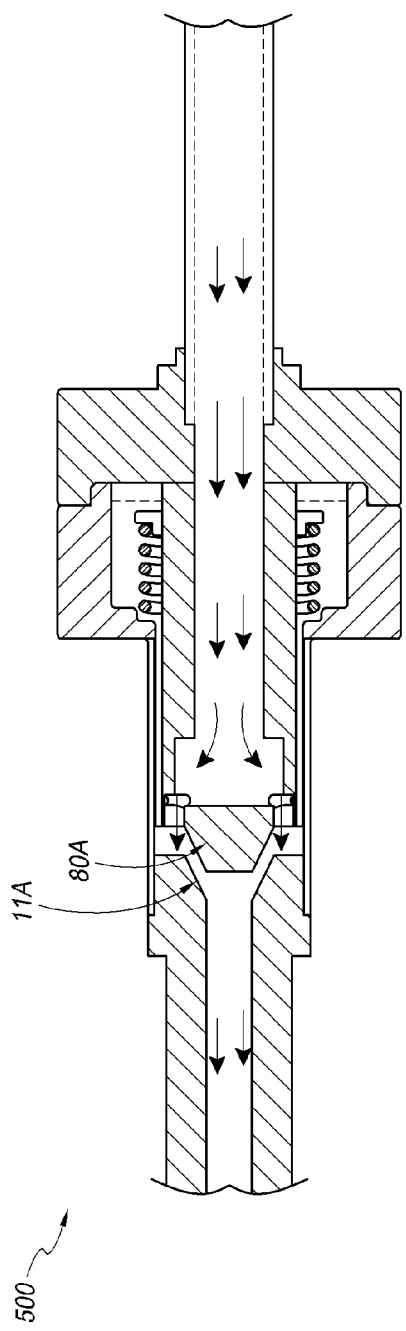
FIG. 20 is a partial side cross-sectional view of an embodiment of an inline needle valve.

It will also be understood that the sealing members for the valves described herein need not be limited to balls, and the valves described herein need not be limited to a ball valve. For example, FIG. 20 shows a partial side cross-sectional view of an embodiment of an inline needle valve 500 that is similar to valve 400 (FIG. 19), but with a tapered sealing member 80A. A needle valve may provide different flow features, and/or may be simpler and less expensive to manufacture than a ball valve. Valve 500 can include a tapered valve seat 11A to conform with and improve sealing with sealing member 80A. Sealing member 80A and/or tapered valve seat 11A can comprise any of a number of different shapes suitable for a needle valve. For example, member 80A can comprise a frustroconical or pyramidal shape. It will be understood that the valves 100, 200, and 300, shown in FIG. 1A-1B, 3A-5, 9 or 10 can be modified to include features of needle valve 500 shown in FIG. 20.

Although illustrated within various contexts, embodiments of the present invention may also be used in other applications. For example, the valves or valve components described herein may be employed with other types of valves than those for a cryogenic application. Additionally, any one or more of the welded engagement perimeters described herein can be employed with any of the embodiments described, and the invention should not be limited to all of them, nor solely to the embodiments in FIGS. 1-3B. Moreover, the valve stems 40 and valve elements 50 are not to be limited to the specific combinations shown in the Figures. For example, the valve stem 40 shown in FIGS. 9 and 10 can be employed with the valve element 50 shown in FIGS. 4A and 4B, and vice versa. Additionally, the embodiments of the valve and various valve components described herein can be configured separately, or as an assembly or kit in any of a number of combinations. It will be understood by those of skill in the art that additional numerous and various modifications can be made without departing from the spirit of the present invention. Therefore, it should be clearly understood that the forms of the invention described herein are illustrative only and are not intended to limit the scope of the invention.

What is claimed is:

1. A cryogenic valve comprising:
    a first port and a second port;
    a valve body comprising a valve seat defining a fluid orifice in fluid communication with the first port;
    a valve stem configured to engage with the valve body, wherein the valve stem comprises a first end and an opposite second end with a longitudinal axis extending through the first end and second end, wherein the valve stem forms a first channel extending substantially along the longitudinal axis, the first channel configured to allow fluid flow through the valve stem, wherein the valve stem is configured to engage with the valve body along a first engagement perimeter;
    a first weld configured to hermetically seal the first engagement perimeter;
    a sealing member;
    a valve element positioned within at least a portion of the first channel, the valve element configured to bias the sealing member against the orifice to substantially block flow through the orifice and the first port, wherein the bias is controlled in response to control of the position of the valve element by a valve actuator;
    a housing configured to substantially seal and enclose at least an engagement portion of the valve body and valve stem along a second engagement perimeter, and form an inner housing cavity configured to substantially enclose the valve stem and thermally isolate at least a portion of the valve body and valve stem, including said engagement portion, from the housing;
    a second weld configured to hermetically seal the second engagement perimeter;
    an electrical connector configured to engage the housing along a third engagement perimeter, and to allow electrical communication through the housing; and
    a third weld configured to hermetically seal the third engagement perimeter.

2. The cryogenic valve of claim 1, wherein the valve element is configured to move with respect to the orifice within the first channel along the longitudinal axis.

3. The cryogenic valve of claim 1, wherein the valve element comprises a second channel configured to allow fluid flow through the valve stem approximately along the longitudinal axis when the valve element is positioned within the first channel.

4. The cryogenic valve of claim 3, wherein the first channel and the second channel are substantially aligned with respect to each other along the longitudinal axis.

5. The cryogenic valve of claim 4, wherein the first channel, the second channel, and at least one of the first port and the second port are substantially aligned with respect to each other along the longitudinal axis.

6. The cryogenic valve of claim 5, wherein the first channel, the second channel, the first port, the second port, and the orifice are substantially aligned with respect to each other along the longitudinal axis.

7. The cryogenic valve of claim 3, wherein at least one of the valve element and the valve stem comprise a third channel in fluid communication with and extending radially outwardly from at least one of the first and second channel.

8. The cryogenic valve of claim 7, wherein the other of the at least one of the valve element and the valve stem comprise a fourth channel in fluid communication with and extending radially outwardly from the other of the at least one of the first and second channel.

9. The cryogenic valve of claim 7, wherein the third channel is approximately orthogonal to the longitudinal axis.

10. The cryogenic valve of claim 3, wherein the second channel extends along an axis that is approximately parallel and radially offset from the longitudinal axis.

11. The cryogenic valve of claim 3, wherein the first channel and the second channel are substantially aligned with respect to each other along the longitudinal axis such than an approximately straight, unobstructed flowpath extends through at least a portion of the first channel and a portion of the second channel.

12. The cryogenic valve of claim 11, wherein the first channel, the second channel, and the second port are substantially aligned with respect to each other along the longitudinal axis such that an approximately straight, unobstructed flowpath extends through the second port, through the first channel, and through a at least a proximal portion of the second channel.

13. The cryogenic valve of claim 3, wherein the first port, second port, valve body and valve stem are sealably engaged with each other such that the first and second channels are isolated and sealed with respect to the inner housing cavity.

14. The cryogenic valve of claim 1, wherein the first channel and the second port are substantially aligned with respect to each other along the longitudinal axis such that an approximately straight, unobstructed flowpath extends through the second port and the first channel.

15. The cryogenic valve of claim 1, wherein the first channel extends longitudinally through the first and second end of the valve stem.

16. The cryogenic valve of claim 1, further comprising the valve actuator, wherein the valve actuator comprises a solenoid coil configured to move the valve element when the solenoid coil is at least one of activated and deactivated.

17. The cryogenic valve of claim 16, further comprising a spring, wherein the solenoid is configured to move the valve element to bias the sealing member against the orifice when the solenoid is activated, and the spring moves the sealing member from being biased against the orifice when the solenoid is deactivated.

18. The cryogenic valve of claim 1, wherein the sealing member comprises a ball.

19. The cryogenic valve of claim 1, wherein the valve element comprises a needle to form a needle valve.

20. The cryogenic valve of claim 1, wherein the valve stem comprises a proximal portion and a distal portion, wherein the proximal portion forms at least a portion of the inner cavity and is configured to engage with the distal portion along a fourth engagement perimeter; and a weld configured to hermetically seal the fourth engagement perimeter.

* * * * *

UNITED STATES PATENT AND TRADEMARK OFFICE
CERTIFICATE OF CORRECTION

PATENT NO. : 8,684,036 B1
APPLICATION NO. : 13/788240
DATED : April 1, 2014
INVENTOR(S) : Satoda It is certified that error appears in the above-identified patent and that said Letters Patent is hereby corrected as shown below:

In the Specification

In column 9 at line 39, Change "20001HV" to --2000HV--.

In column 15 at line 34, Change "FIG." to --FIGS.--.

Signed and Sealed this
Seventh Day of October, 2014

Michelle K. Lee
*Deputy Director of the United States Patent and Trademark Office*